UNITED STATES PATENT OFFICE.

HIRAM GRANT, OF CHICAGO, ILLINOIS.

IMPROVED ROOFING COMPOSITION FOR RAILROAD-CARS, &c.

Specification forming part of Letters Patent No. 34,251, dated January 28, 1861.

To all whom it may concern:

Be it known that I, HIRAM GRANT, of the city of Chicago, county of Cook, and State of Illinois, have discovered and invented a new mode for preventing the roofs and coverings of buildings, railroad-cars, decks of vessels, boats, &c., from leaking or decaying; and I do hereby declare that the following is a full, clear, and exact description of the compound or composition and mixture used for said purpose.

To enable others to make, compound, mix, and use the same, I will proceed to describe minutely the different materials to be used, the manner of preparing, mixing, or compounding the same, the proportions and quantity of each ingredient used, and the manner of applying the same, which is as follows—that is to say:

I take twenty-five (25) gallons of coal-tar, eight (8) pounds of white pulverized resin, three (3) gallons of india-rubber when cut in spirits of turpentine, one and one-half (1½) gallon shellac varnish, two and one-half (2½) gallons asphaltum varnish, two (2) gallons of brown japan, three (3) gallons of boiled linseed-oil, twenty-five (25) pounds of white lead, sixty (60) pounds of mineral paint, six (6) pounds of yellow ocher, and five (5) pounds of sugar of lead. Put into kettle or vessel, first the coal-tar and then the other materials above mentioned, and in the order and quantity stated, and keep stirring and agitating the same as it is put in until all the different ingredients are in said kettle or vessel, seeing that the same is thoroughly mixed. This mixing can be done either warm or cold. The composition is then ready for use. Apply the same with a brush, with or without sand or gravel. In cases where you wish to make the roof or covering fire-proof, put coarse clean sand on top of last coat of composition, and can be used on wood, tin, canvas, or felt.

What I claim as my invention and discovery, and desire to secure by Letters Patent, is—

The above-named composition, matter, or ingredients, when prepared in the proportions and in the manner specified above and applied as therein stated.

HIRAM GRANT.

Witnesses:
H. V. MAN,
T. S. BAKER.